March 15, 1927.
A. N. TURNQUIST
1,621,444
OIL REGULATOR
Filed Jan. 27, 1925
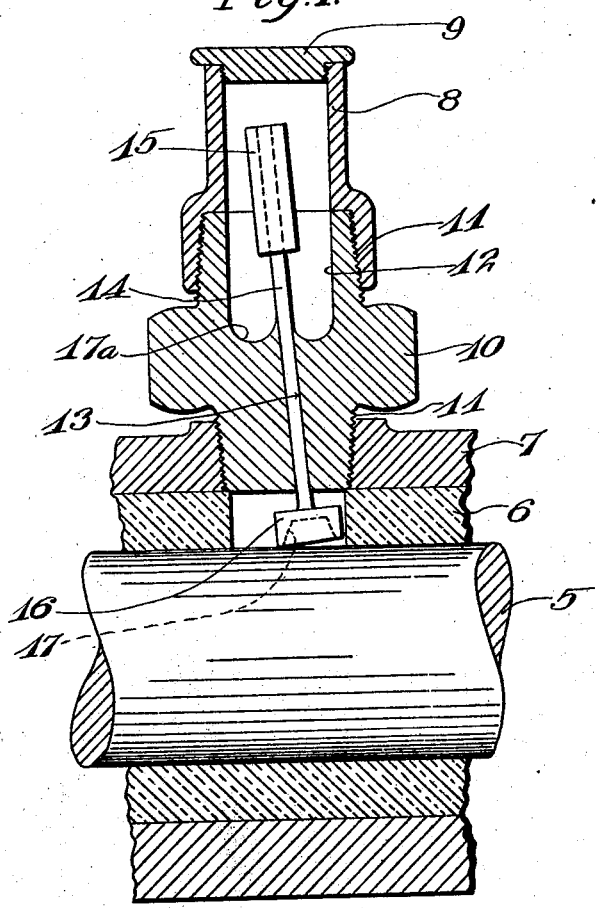
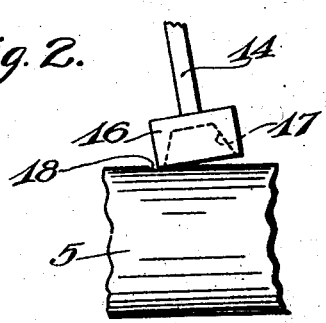
Inventor:
Alexander N Turnquist.
Milo B Stevenson Co.
Attorneys.

Patented Mar. 15, 1927.

1,621,444

UNITED STATES PATENT OFFICE.

ALEXANDER N. TURNQUIST, OF GLEN ELLYN, ILLINOIS.

OIL REGULATOR.

Application filed January 27, 1925. Serial No. 5,162.

This invention relates to devices used for regulating the supply of oil to shafts and the like for purposes of lubrication, and its object is to provide a control or regulator which functions automatically.

A further object of the invention is to limit the supply of the oil to the period in which the part lubricated is active, resulting in considerable economy in the use of the oil.

A still further object is to employ a structure of the utmost simplicity consistent with the results for which it has been designed, thereby making the device inexpensive to produce and sell.

A final, but nevertheless important object of the invention is to so design it as to operate efficiently without the need of adjustment or frequent attention.

With the above objects in view, as well as any others that may suggest themselves from the description and claims to follow, reference is had to the accompanying drawing, in which:—

Figure 1 is a vertical section of the novel regulator, showing its application; and Fig. 2 is a fragmental elevation of a modification.

Referring specifically to the drawing, 5 denotes a horizontal shaft operating in the babbitt filler 6 of a bearing 7. The bearing may receive its lubrication from any suitable source, but for the sake of illustration a cup 8 has been shown, provided with a cap closure 9.

The novel regulator is embodied in an intermediary nipple 10 which serves as a connection between the cup 8 and the bearing 7, being threaded into these as indicated at 11. The bore in the bearing into which the nipple is threaded is continued through the babbitt filler 6, so that direct access to the shaft 5 may be had.

The nipple 10 is drilled with a large bore 12 from above, to serve as a continuation of the oil cup 8, and this bore is continued downwardly in much reduced form, as indicated at 13, to communicate with the chamber between the end of the nipple and the shaft.

The bore 13 is slightly out of vertical alinement, and is adapted to receive slidably a round stem 14 fitted with a weight 15 at its upper end and a head 16 at its lower end. The head 16 is circular in cross-section, and its extreme face is in a slightly inclined plane.

Due to its weighted upper end, the stem 14 rests with its head upon the top or crown of the shaft 5; and, since the stem is inclined, the head seats with but one point or portion of its edge, the nipple being adjusted as screwed down to a point where the stem will lie in a vertical plane coinciding with the axle of the shaft. It will be evident that the turning of the shaft will induce the rotation of the stem through friction with the touching edge of the head. Since the bottom face of the latter is also inclined, as previously mentioned, the rotation of the stem will also occasion a rising and falling motion thereof, due to the restoration by weight of the otherwise departing edge which is designed to maintain its contact with the crown of the shaft.

The combined rotary and reciprocating motion on the part of the stem, as induced by its weight and the motion of the shaft, serves to work a film of oil down from the cup to the shaft. Oil fed by gravity or pressure usually requires a passage of sufficient width to permit its flow, and such flow must necessarily be interrupted to prevent excess lubrication or waste, such interruptions—as by a drop feed—causing periods in which the lubrication is inadequate; also, such lubrication requires shutting off and other attention when lubrication is no longer necessary, so that waste is occasioned in case these duties are overlooked or neglected. In the present case, a film of oil is constantly dispensed as the shaft rotates, this film being however so limited in volume that the feed is very economical. Of course, the regulator may be designed in various models to suit different requirements along lines of volume of supply, rate of supply, speed of the running gear, etc.

Should the shaft cease its operation, the novel regulator is designed to stop the flow of oil automatically, since the oil, unassisted by the action of the regulator cannot penetrate the minute space around the stem by gravity, on account of its thickness or body. The feed of the oil will thus be arrested, and none will be used until the shaft is again set in motion. In this event, any oil having a tendency to congeal around the stem will be quickly loosened by movement thereof, as previously explained. The floor of the large bore in the nipple may be sunken around the stem, as indicated at $17^a$ to catch sediment and dirt.

In order that wear may not flatten the head 16 unduly along the area of contact, the same is made hollow in the fashion of a bell—as shown at 17—to present a narrow surface or rim at all times.

As a modification, the weight 15 may be replaced or augmented by a compression spring, in case some pressure is desired to assure the contact of the regulator with the shaft. Also, the vertical movement of the regulator may be induced by a nick or inequality 18 in the periphery of the shaft, as indicated in Fig. 2, in which event the bottom surface of the head 16 need not be inclined as before, but square with the sides of the head. Obviously, the regulator will fall each time the nick or inequality meets it, performing the same function as before.

In conclusion, it will be evident that a regulator is herein provided which is entirely automatic in action, decidedly economical in the feed, constant to assure a uniformly distributed feed, and exceedingly simple and inexpensive to produce.

I claim:—

1. The combination with a rotatable shaft of a lubricating device therefor, comprising an oil receptacle opposite the shaft, an inclined stem slidable through the bottom of the receptacle and directed toward the shaft, and an annular enlargement carried by the stem and adapted for rolling contact with the shaft.

2. A lubricator comprising an oil receiving cup having attaching means provided with a bore extending out through the forward end thereof, and a stem snugly extending through said bore and having the forward end thereof provided with a shaft engaging enlargement, said stem being constantly tilted and provided at the rear end thereof with a weight.

3. The combination with a rotatable shaft of a lubricating device therefor, comprising an oil receptacle opposite the shaft, an inclined stem slidable through the bottom of the receptacle and directed toward the shaft, and an annular enlargement carried by the stem, the peripheral edge of said enlargement being in a plane oblique to the axis of the shaft and having rolling contact with the shaft.

4. The combination with a rotatable shaft of a lubricating device therefor, comprising an oil receptacle opposite the shaft, an inclined stem slidable through the bottom of the receptacle and directed toward the shaft, and an inverted cup carried by the stem, the rim of said cup having rolling contact with the shaft.

5. The combination with a movable shaft, of a lubricator therefor having an oil receiving cup and a movable stem, said movable stem extending through said oil receiving cup and being provided with a shaft engaging portion disposed obliquely with respect to the axis of the shaft.

6. The combination with a rotatable shaft, of a lubricator therefor having an oil receiving cup and a movable stem, said movable stem extending through said oil receiving cup and being provided with a shaft engaging portion disposed obliquely with respect to the axis of the shaft whereby the rotation of the shaft will reciprocate and rotate the stem.

In testimony whereof I affix my signature.

ALEXANDER N. TURNQUIST.